United States Patent

[11] 3,545,362

[72] Inventor  Kiyoshi Kitai
              Tokyo, Japan
[21] Appl. No. 643,892
[22] Filed     June 6, 1967
[45] Patented  Dec. 8, 1970
[73] Assignee  Kabushiki Kaisha Hattori Tokeiten
[32] Priority  June 10, 1966
[33]           Japan
[31]           No. 41/37035

[54] AUTOMATIC EXPOSURE CONTROL DEVICE IN THE FLASH LIGHT PHOTOGRAPHY
     5 Claims, 3 Drawing Figs.
[52] U.S. Cl. .................................................... 95/64
[51] Int. Cl. .................................................... G03b 7/00
[50] Field of Search ........................................ 95/64

[56]            References Cited
              UNITED STATES PATENTS
3,162,111  12/1964  Koppen ....................... 95/64C
3,273,482  9/1966   Starp ........................... 95/64C Primary Examiner—John M. Horan
Attorney—Harry Sommers ABSTRACT: This invention relates to cameras and comprises an automatic exposure control device for setting camera shutter in accordance with movement of first and second control members, such as numbered rings, so that the operator, by adjusting the position of the rings, will in turn actuate sensing means, correspondingly moving a translating lever connected to the camera shutter mount, thus moving the camera shutter to the degree so determined.

INVENTOR
KIYOSHI KITAI
BY ATTORNEY

AUTOMATIC EXPOSURE CONTROL DEVICE IN THE FLASH LIGHT PHOTOGRAPHY

This invention relates to a control device for setting the shutter opening or exposure aperture of a camera to conform to conditions indicated by several control members, such as a guide number ring and a distance adjusting ring, setting the position of means connected to said control members, and thereby, in accordance with settings of the control members automatically opening the shutters to the degree to conform to the control member settings.

The device is useful in connection with cameras of any type, wherein it is desirable to adjust the shutter opening in accordance with factors such as flashbulb guide numbers, and photographic distance numbers for which two or more control members may be set by the user by rotation or otherwise.

The shutter opening or aperture size of automatic flash exposure cameras is adjusted in accordance with pg,2 the photographic distance, the guide numbers of the flashbulb, and the film sensitivity. One of the objects of the invention is to provide a device to attain such adjustment wherein the diaphragm shutter is smoothly, accurately and automatically adjusted by movement of control members. Another object of the invention is to provide means for so positioning a translating member, such as a lever, on setting a control member such as rings (for example, the guide number ring) that on setting a further control member, such as a distance adjusting ring, the translating member will thereby be automatically moved to open the shutter for precisely the opening size desired. The automatic flash exposure device may thus be triggered (in flash cameras) to smoothly and accurately snap the picture.

A further object of the invention is to provide a device having means for accurately sensing and translating the so sensed values of adjusting rings, for example, of cameras, to open the lens or camera shutters to define precisely the aperture size for which the camera is to be set, requiring nothing further on the part of the user than setting of the rings to desired numbers, the remainder of the operation being performed automatically, smoothly and accurately.

In the drawings and description below, application of the invention has been exemplified in connection with a camera. It will be apparent from the disclosure herein that the invention may be used to control actuation of any other mechanical or electrical mechanism, wherein a first control member sets the position of a translating lever for actuation to a correspondingly determined extent by a second control member, to thereby provide the desired actuation of a mechanism.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

Figure 1:
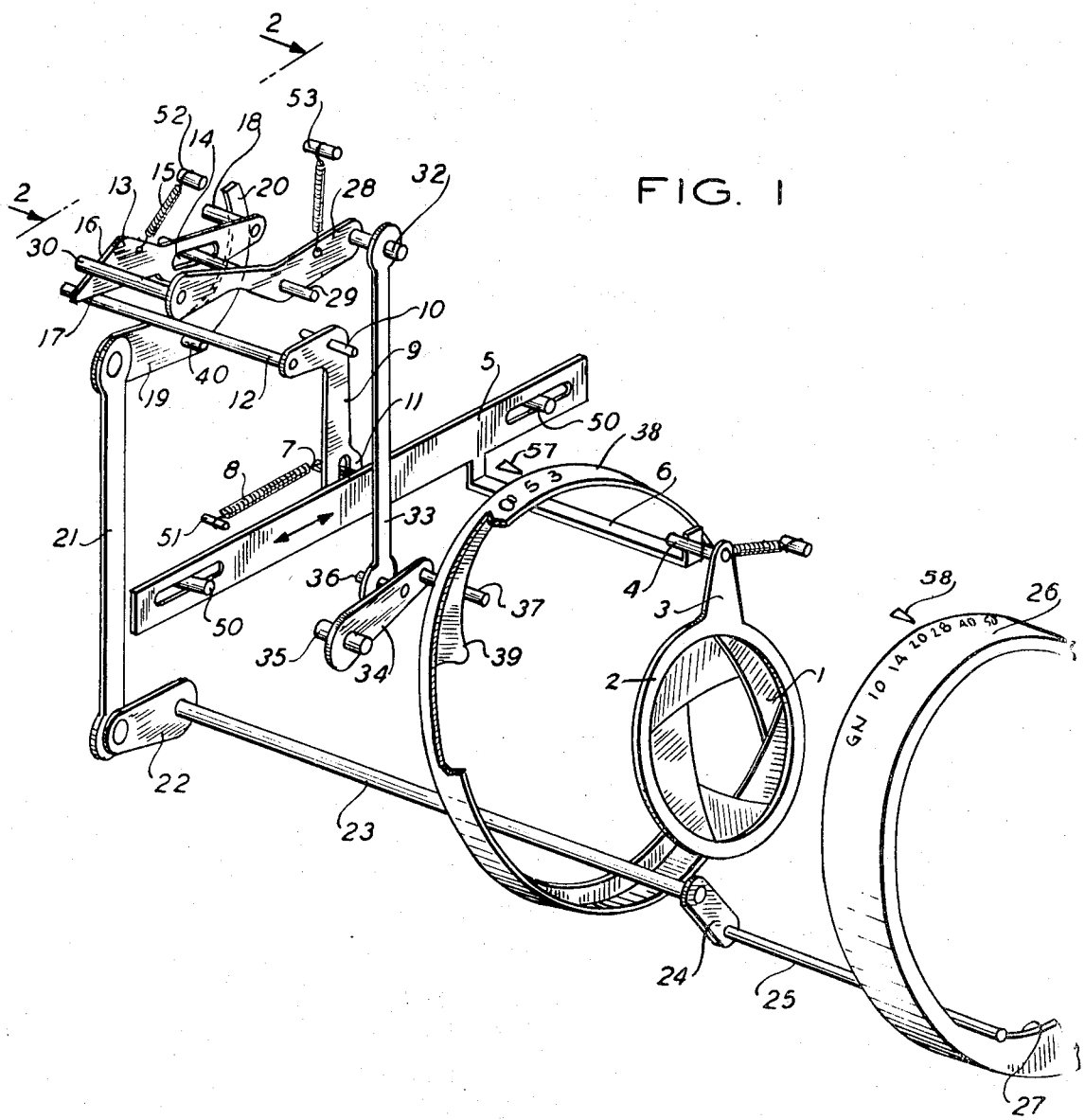
FIG. 1 is a perspective view of a control device embodying the invention.
Figure 2:
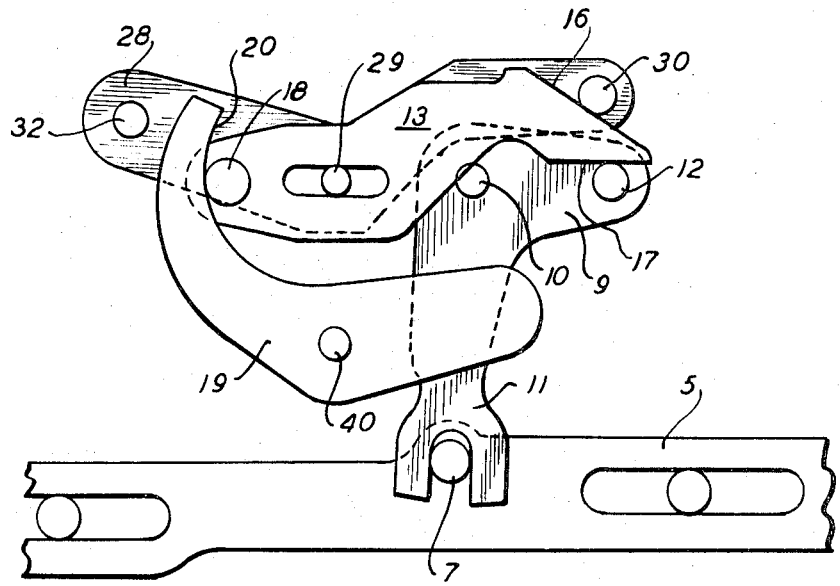
FIG. 2 is an enlarged, fragmentary rear elevational view of parts thereof.
Figure 3:
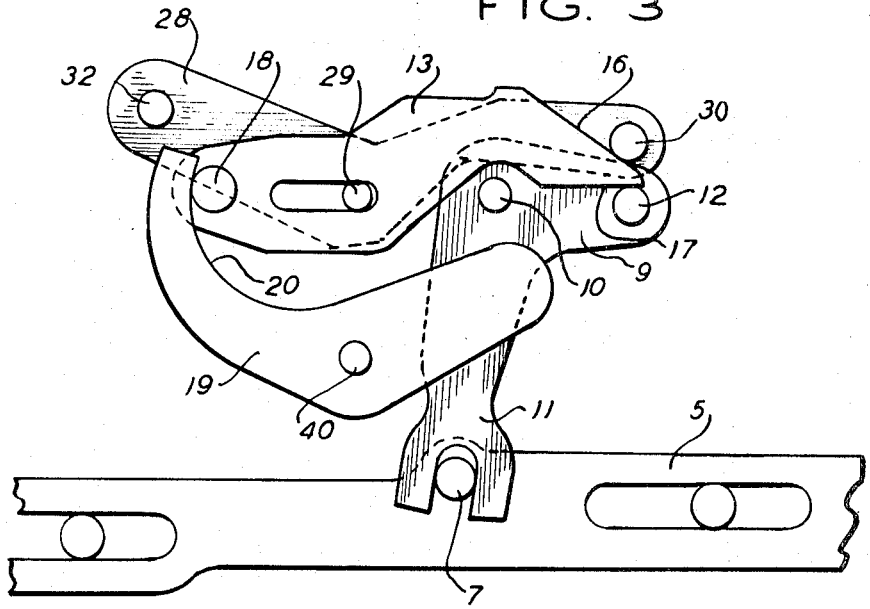
FIG. 3 is a similar view of the parts moved to another position.

As shown in the drawings, the device is adapted to be used in connection with a camera having first and second control members 26, 38, which may be rotatable mounted in the camera for setting by the user in registration with scale pointers 57, 58.

In the practical form of the invention, shown in FIG. 1, the user adjusts the position of the first control member 26 to register the desired number with pointer 58, thereby correspondingly positioning the control value cam surface 27 of member 26 and thus correspondingly moving the linkage 25, 24, 23, 22, 21, 19 (rotatable on pin 40) and 20 to shift or set the position of translating lever 13 in accordance with the so adjusted position of first control number 26.

The described linkage includes guide number lever 19 which is rotatable on pin 40 and is connected, as by connecting rod 21, with link 22, which in turn, is connected to rotating shaft 23, which is suitably journaled in the device and connected to link 24, having the pin or sensing member 25 extending therefrom, to sense the cam control value surface 27.

Movement of the guide number lever 19, attained by the setting of ring 26, moves translating lever 13 axially to the left or right on pivot pin 29, to thus set the center or axis of rotation of distance lever 28, as presently more particularly described. The axis of rotation of the translating lever 13 is shifted in accordance with the adjusted guide numbers by a guide number lever and is functionally rotated in accordance with the adjusted guide numbers and the adjusted distance value. The second control member, for example, (distance control member ring 38) is rotated by the user to the setting desired, in registration with pointer 57, positioning the control value surface 39 thereof (such as a cam) in position to, in turn, correspondingly move the distance lever 28, and thereby correspondingly move the translating lever 13, and thereby, through intermediate linkage, such as 12. 9. 11 and 5, correspondingly move the shutter engaging arm 6 of adjusting lever 5 against pin 4 of shutter mount projection 3, to rotate the shutter mount and thereby open the shutters to the correct aperture size, automatically and in accordance with settings made as above noted.

The shutter mount may, as in the example shown in the drawings, include the diaphragm ring 2, wherein the shutter blades 1 are positioned, said shutter blades moving to close the diaphragm opening on rotation of the diaphragm ring 2 in accordance with the movement of adjusting lever 5, as below more particularly described.

My invention is adapted to be used in connection with any shutter mounting means, including, for example, shutter mounts positioned other than in a diaphragm ring—for example, positioned for parallel movement—having reciprocating rather than radial movement, and so moved, pursuant to the invention, as will be obvious to those skilled in the art, from the disclosure herein.

The distance lever 28, on movement of ring 38, senses the control value surface 39 of the ring through link 34, rotatably mounted on the pivot point 35 and connected as by pin 36, to rod 33, in turn connected as by pin 32 to one end of distance lever 28. The latter is rotatably mounted on a pivot pin 29 or the like, which passes freely through an axial slot 14 in translating lever 13. The translating lever 13 is normally urged to clockwise rotation on pin 29 by spring 15 whose opposite end is held or anchored as at 52. The translating lever is set on being axially moved by contact engagement of its extended end plane or pin 18 with the cam portion 20 of guide number lever 19, which is pivoted on a pivot pin 40. Cam surface 16 at the forward end of the translating lever 13 has engagement with a pin or extended plane or surface 30 at the forward end of the distance lever 28. Rotation of distance lever 28, therefore, moves the translating lever to the degree determined by the set position of the latter on its pivot pin or axis of rotation 29. Such rotation of translating lever 13 correspondingly moves the intermediate lever 9, (rotatably mounted on pivot pin 10) the extended planar surface or pin 12 of lever 9 engaging the cam undersurface 17 of the translating lever 13. Lever 9 is provided with a forked end 11 engaging pin 7 of a diaphragm adjusting lever 5, which is positioned, as on pins 50 passing through slots therein, for axial reciprocation and is normally urged in one direction by spring 8 engaging pin 7 and a fixed point 51 at the other end. Diaphragm adjusting lever 5 is provided with an extended arm 6, which may be upturned at its end (as shown in FIG. 1) for engagement with pin 4 on the projection or extension 3 of the diaphragm ring 2, said ring being normally urged in one direction by a spring which is connected at its other end to a fixed point. The distance lever 28 is normally urged into engagement with the translating lever 13 by spring fixed, at one end, to the distance lever 28, and at the other end to a fixed point 53. The point of rotation of the translating lever 13 is shifted in accordance with the sensed position of the adjustment guide number lever. Cam surface 20 of the guide number lever is formed so that the translating lever does not slide to left or right when the translating lever is rotated by the distance lever 28. The translating lever and the distance lever operate as one body; when the distance value is adjusted, the automatic flash exposure device operates smoothly and accurately. When the translating lever 13 is rotated around the pin 29 by the distance lever 28, the translating lever 13 is not always displaced by the cam surface 20.

As above noted, the translating lever 13 is initially positioned according to the adjusted guide number (ring 26) and is then rotated in accordance with the adjusted distance value, to attain automatic and accurate opening of the camera shutter or aperture in accordance with the adjusted (ring 26) guide number and the adjusted (ring 38) distance value.

To summarize, therefore, the drawings illustrate a practical application of the invention wherein the translating lever 13 is initially set by the movement of the guide number lever 19, and is then rotated on movement of the distance adjusting ring 38, and thus distance lever 28, lever 13 thereby moves intermediate lever 9; the latter in turn moves the diaphragm adjusting lever 5 to, in turn, move the diaphragm ring 2, for correspondingly movement of the diaphragm blades 1, to define the desired aperture size.

Applicant claims the benefit of the filing date under the International Convention, of the corresponding Japanese application 37035/66 filed June 10, 1966.

While the foregoing disclosure of exemplary embodiments is made in accordance with the Patent Statutes, it is to be understood that the invention is not limited thereto or thereby, the inventive scope being defined in the appended claims.

I claim:

1. A device for setting the exposure value of the shutter of a camera in accordance with the movement of first and second control members of the camera, said members having control value surfaces;

said camera having means movably mounting a shutter therein;

means engaging the control value surface of the first control member;

an elongated translating lever, and means movably mounting said translating lever in said device for translation movement along the longitudinal axis thereof and for angular tilting movement about a pivot axis arranged transversely of said longitudinal axis;

said means engaging the control value surface of the first control member also engaging said translating lever for translating said lever along said longitudinal axis thereof, to set the position of the translating lever;

means engaging the control value surface of the second control member, and engaging the translating lever for tilting the translating lever about said pivot axis from its so set position; and means connecting the translating lever and the shutter mount means, for setting the shutter in accordance with said movements of the translating lever.

2. In a device for exposure control of a camera, as set forth in claim 1, said means engaging the control value surface of the first control member including movable cam means engageable with means on one end of said translating lever for effecting translation of said translating lever.

3. In a device for exposure control of a camera as set forth in claim 2, the other end of said translating lever having cam means thereon, and both said means engaging the control value surface of the second control member and said connecting means being in engagement with said other end of said translating lever.

4. In a device for exposure control of a camera, as set forth in claim 3, including resilient means connected to maintain said means engaging the control value surface of the first control member, said means engaging the control value surface of the second control member, and said connecting means in engagement with said translating lever.

5. In a device for exposure control of a camera as set forth in claim 1: said means connecting device; translating lever and the shutter mount means including an elongated diaphragm adjusting lever and means reciprocably mounting said diaphragm adjusting lever in said device; and means connecting the diaphragm adjusting lever and translating lever for so setting the shutter in response to said movements of said translating lever.